United States Patent
Weaver, Jr. et al.

(10) Patent No.: US 6,515,961 B1
(45) Date of Patent: Feb. 4, 2003

(54) DECRESTING PEAKS IN A CDMA SIGNAL

(75) Inventors: Lindsay A. Weaver, Jr., Boulder, CO (US); Brian K. Harms, Boulder, CO (US); Anthony C. K. Soong, Superior, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/265,203

(22) Filed: Mar. 10, 1999

(51) Int. Cl.$^7$ .......................... H04B 7/216; H04J 13/02
(52) U.S. Cl. ................ 370/206; 370/209; 370/335; 370/342; 375/146; 375/297
(58) Field of Search ............................ 370/203, 206, 370/208, 209, 335, 342, 441; 327/180, 309; 330/278, 284; 375/130, 140, 146, 296, 297

(56) References Cited

U.S. PATENT DOCUMENTS

| | | | |
|---|---|---|---|
| 4,291,409 A | * 9/1981 | Weinberg et al. ............... 375/1 |
| 4,462,001 A | 7/1984 | Girard ........................ 330/149 |
| 5,287,387 A | 2/1994 | Birchler ....................... 375/60 |
| 5,742,201 A | * 4/1998 | Eisenberg et al. ............. 330/2 |
| 5,751,705 A | * 5/1998 | Sato ........................... 370/335 |
| 6,009,090 A | * 12/1999 | Oishi et al. .................. 370/342 |
| 6,031,865 A | * 2/2000 | Kelton et al. ................ 375/206 |
| 6,097,714 A | * 8/2000 | Nagatani et al. ............. 370/342 |

FOREIGN PATENT DOCUMENTS

| EP | 0751630 | 6/1996 | ........... H04B/1/707 |
|---|---|---|---|
| EP | 0849919 | 12/1997 | ........... H04L/27/26 |
| GB | 2315379 | 7/1996 | ........... H04J/13/02 |

OTHER PUBLICATIONS

Behbahani, et al., "On Spectral Efficiency of CDMA Mobile Radio Systems" IEEE, 1994, pp. 505–509.

* cited by examiner

*Primary Examiner*—Alpus H. Hsu
(74) *Attorney, Agent, or Firm*—Russell B. Miller; Christopher O Edwards

(57) ABSTRACT

The invention is a CDMA decresting technology that reduces or eliminates peaks in the CDMA signal. The CDMA technology generates a correction signal in response to peaks in the CDMA signal that exceed a value. The value typically corresponds to the maximum power level of a power amplifier. The CDMA technology combines the correction signal with the CDMA signal to generate a decrested CDMA signal with reduced peaks. In some examples of the invention, the CDMA technology processes polar coordinate representations of the quadrature components of the CDMA signal to generate the correction signal. Using the invention, the power amplifier in a CDMA base station can operate at increased power levels without exceeding out-of-band signal power limitations. As a result, the base station operates more efficiently and with a greater range or capacity.

20 Claims, 8 Drawing Sheets

DECRESTING PEAKS IN A CDMA SIGNAL

BACKGROUND OF THE INVENTION

I. Field of the Invention

The present invention relates to Code Division Multiple Access (CDMA) systems. More particularly, the present invention includes, but is not limited to, a novel and improved CDMA base station that decrests CDMA signal peaks to reduce out-of-band signal emission.

II. Description of the Related Art

Code Division Multiple Access (CDMA) technology is commonly used in communications systems. In a typical CDMA system, a CDMA base station transmits a CDMA signal to numerous CDMA communications devices, such as wireless telephones. The CDMA signal is comprised of numerous individual user signals. The CDMA base station generates the CDMA signal by encoding each individual user signal with a unique spreading sequence, such as a pseudo random sequence. The CDMA base station then adds the encoded user signals together to form the CDMA signal.

In a CDMA system, individual user signals are not separated based on frequency or time, but are spread across the entire frequency band. Each CDMA communications device derives its particular user signal based on the unique spreading sequence. Due to this combination of multiple signals encoded with random sequences, the CDMA signal has random signal peaks that cause problems when the CDMA signal is amplified.

The CDMA base station uses a power amplifier to amplify the CDMA signal. The power amplifier contributes unwanted noise when operated above a maximum power level. Unfortunately, the random peaks in the CDMA signal force the power amplifier to operate above this maximum power level. In contrast, the typical frequency modulated (FM) signal does not have random signal peaks, so the power amplifier is able to continuously operate below the maximum power level.

The power amplifier contributes noise in the form of signal power outside of the frequency band of the CDMA signal. This signal power is referred to as out-of-band signal power. Out-of-band signal power is a problem because it interferes with other signals in the neighboring frequency bands. These other signals are disrupted by the interference. Government agencies, such as the Federal Communications Commission in the United States, strictly regulate the interference caused by out-of-band signal power.

The existing solution to this problem is to operate the power amplifier in the CDMA base station below its maximum power level. This reduces the amount of out-of-band signal power caused by the random peaks in the CDMA signal. This solution is lacking because the power and range of the base station is reduced. In addition, the power amplifier may operate less efficiently below the maximum power level.

CDMA systems would be improved by techniques to reduce the noise contribution of the power amplifier in the base station. The noise reduction would directly increase the power and efficiency of the CDMA base station.

SUMMARY OF THE INVENTION

The above-described problem is solved with CDMA decresting technology that reduces or eliminates random peaks in the CDMA signal. The power amplifier in a CDMA base station can then operate at increased power levels without exceeding out-of-band signal power limitations. Testing has shown a base station power increase of 3 dB when decresting technology is used. As a result, the base station efficiently operates with a greater range or capacity. This improvement is passed on to the wireless communications user in the form of higher quality and lower cost.

The CDMA decresting technology generates a correction signal in response to peaks in the CDMA signal that exceed a value. The value typically corresponds to the maximum power level of a power amplifier. The CDMA technology combines the correction signal with the CDMA signal to generate a decrested CDMA signal with reduced peaks. In some examples of the invention, the CDMA technology processes polar coordinate representations of the quadrature components of the CDMA signal to generate the correction signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Decresting—FIGS. 1–4

Figure 1:
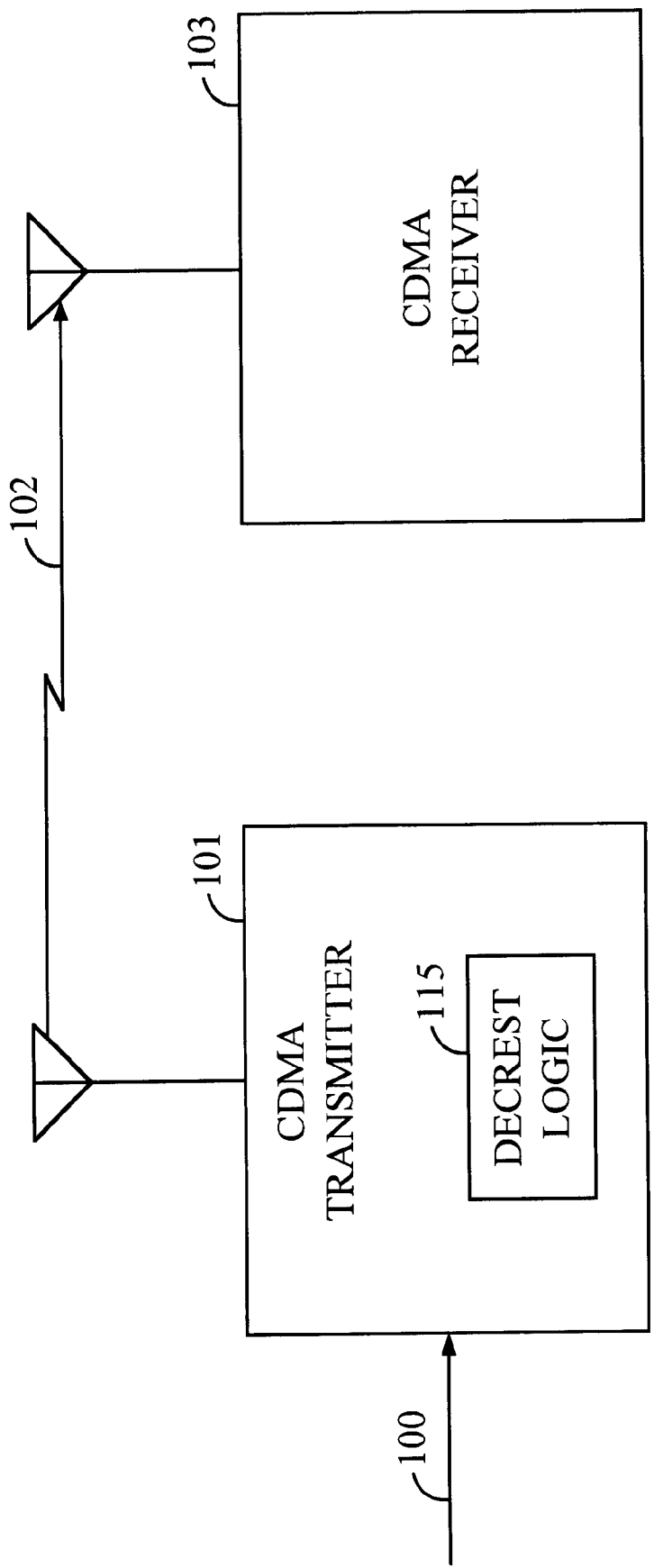
FIG. 1 is a block diagram of a CDMA system with decresting logic.

FIG. 1 depicts a baseband CDMA signal 100, a CDMA transmitter 101, an RF CDMA signal 102, and a CDMA receiver 103. CDMA is a spread-spectrum communications technology. Some versions of CDMA are specified by standards, such as IS95 approved by the Telecommunications Industry Association. The CDMA signal 100 could be any CDMA signal, such as the signal produced by a cell site modem in a CDMA base station. The CDMA receiver 103 could be any CDMA device capable of receiving a CDMA signal, such as a wireless CDMA telephone.

The CDMA transmitter 101 could be any CDMA transmission device that includes decresting logic 115 to decrest peaks in the CDMA signal 100. The CDMA transmitter 101 typically amplifies the decrested CDMA signal and transmits the amplified CDMA signal 102 to the CDMA receiver 103. One example of the CDMA transmitter 101 is a CDMA base station.

In operation, the decresting logic 115 in the CDMA transmitter 101 decrests the CDMA signal 100 to form CDMA signal 102. To perform the decresting, the decresting logic 115 generates a correction signal in response to peaks in the CDMA signal 100 that exceed a value for the CDMA signal 100. The decresting logic 115 then combines the correction signal with the CDMA signal 100 to generate a decrested CDMA signal with reduced peaks. In some examples of the invention, the decresting logic 115 processes polar coordinate representations of the quadrature components of the CDMA signal 100 to generate the correction signal. The CDMA transmitter 101 transmits the decrested CDMA signal 102 to the CDMA receiver 103 over the air interface. Although the invention is depicted using an air interface, other transmission media could also be used, such as RF cable, power lines, or telephone lines.

Figure 2:
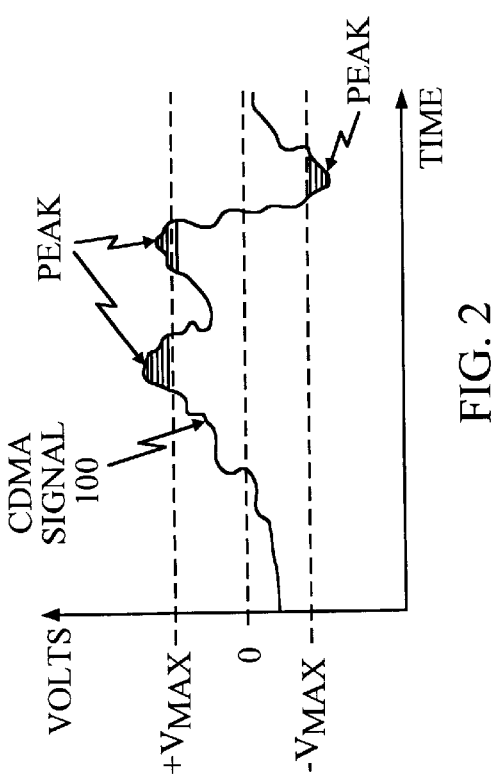
FIG. 2 is a graph illustrating: CDMA signal peaks.

FIG. 2 illustrates the CDMA signal 100. The vertical axis represents CDMA signal amplitude in volts, and the horizontal axis represents time. The dashed lines represent a maximum positive signal voltage (+Vmax) above the zero voltage point, and a negative maximum signal voltage (−Vmax) below the zero voltage point. The CDMA signal 100 has "peaks" above and below the Vmax voltages. The peaks are shaded on FIG. 2. Using the decresting logic 115, the CDMA transmitter 101 eliminates or reduces the peaks in the CDMA signal 100.

The CDMA signal 100 is comprised of multiple individual user signals that are each encoded with random sequences. The result of multiple users and random sequences are peaks that are not typically present in other communication signals. For example, a frequency modulated signal fits within a constant signal envelope because individual user signals are placed within discreet frequency bands and are not combined or encoded with random sequences.

Figure 3:
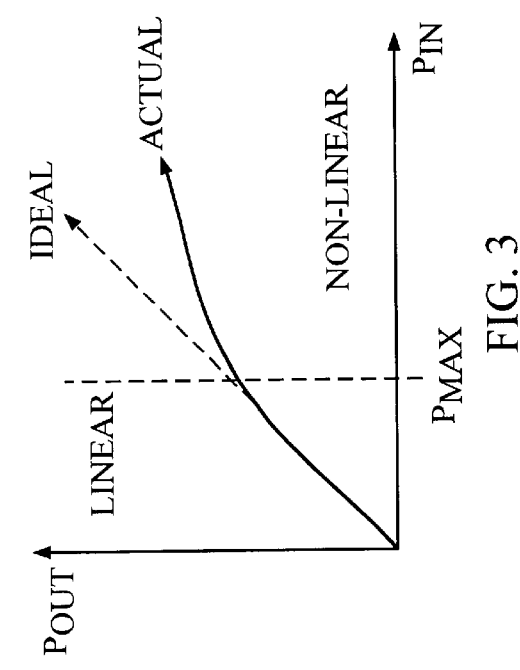
FIG. 3 is a graph illustrating the operating characteristics of a power amplifier.

FIG. 3 illustrates the operating characteristics of a typical power amplifier used to amplify a CDMA signal. For example, the power amplifier might be in the CDMA transmitter 101. The horizontal axis represents the input signal power (Pin), and the vertical axis represents the output signal power (Pout). If Pin is below a maximum power level (Pmax), then the power amplifier operates in a linear manner where an increase in Pin is matched by a proportional increase in Pout. If Pin is above Pmax, then the power amplifier operates in a nonlinear manner where an increase in Pin is not matched by a proportional increase in Pout. Pout is less than ideal in the nonlinear operating range.

Pmax can be set based on various factors, such as: 1) industry specifications for unused Walsh energy, 2) ratio of in-band to out-of-band signal power, temperature, i.e. lower during a cold start, the ratio of bit energy to interference and noise Eb/Io, 3) the IS-97 industry standard Rho metric that is used to measure waveform fidelity, and/or 4) other suitable metrics. Pmax can be adjusted during system operation based on on-going measurements of desired metrics and corresponding adjustment of Pmax to optimize performance.

Taking FIGS. 2 and 3 together, it should be noted that the Vmax voltage levels on FIG. 2 correspond to the Pmax on FIG. 3. Thus, the peaks above +Vmax and below and −Vmax would drive the power amplifier above Pmax into the nonlinear operating range. When operated in the nonlinear range, the power amplifier exhibits undesirable performance in the form of decreased fidelity and increased noise. In addition, the transmitter 101 does not meet industry specifications, such as unused Walsh energy. Decresting eliminates or reduces the operation of the power amplifier in the nonlinear range, and thus improves fidelity while reducing noise.

Figure 4:
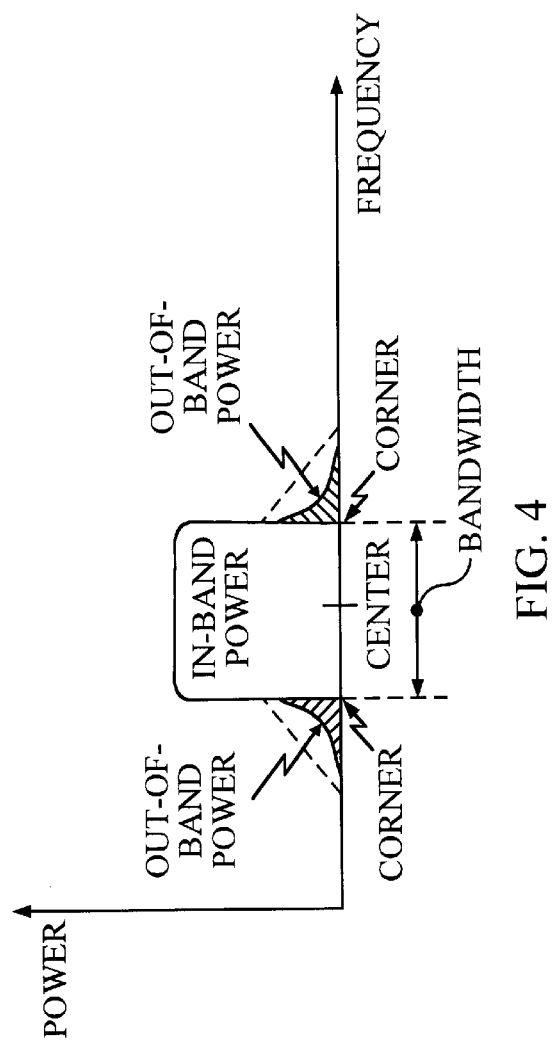
FIG. 4 is a graph illustrating the frequency spectrum of a CDMA signal.

FIG. 4 illustrates the frequency characteristics of CDMA signal 102. The vertical axis represents signal power, and the horizontal axis represents frequency. The desired "in-band" signal power is contained within the bandwidth defined by corner frequencies that are above and below a center frequency. A typical example is a 1.25 MHz bandwidth centered about a 1.96 GHz center frequency. The signal power drops significantly outside of the bandwidth, but some undesired "out-of-band" signal power is still present, and is shaded on FIG. 4. Out-of band signal power is undesirable because it represents wasted power that interferes with other signals in neighboring frequency bands. The power amplifier generates significant out-of-band signal power when it operates in the non-linear range. The dashed lines above the shaded out-of-band power on FIG. 4 represent the increased out-of-band signal power generated when decresting is not used.

When FIGS. 2–4 are taken together, it can be appreciated that the CDMA signal peaks on FIG. 2 drive the power amplifier above Pmax on FIG. 3 and cause the power amplifier to generate undesirable out-of-band signal power shown by the dashed lines on FIG. 4. The decresting logic 115 reduces the CDMA signal peaks and corresponding out-of-band signal power to the shaded area on FIG. 4. This reduction is typically offset by operating the power amplifier at a higher power level. Advantageously, the power amplifier has greater range or capacity at the higher power level, but does not generate intolerable out-of-band signal power.

CDMA Decresting System—FIGS. 5–9

Figure 5:
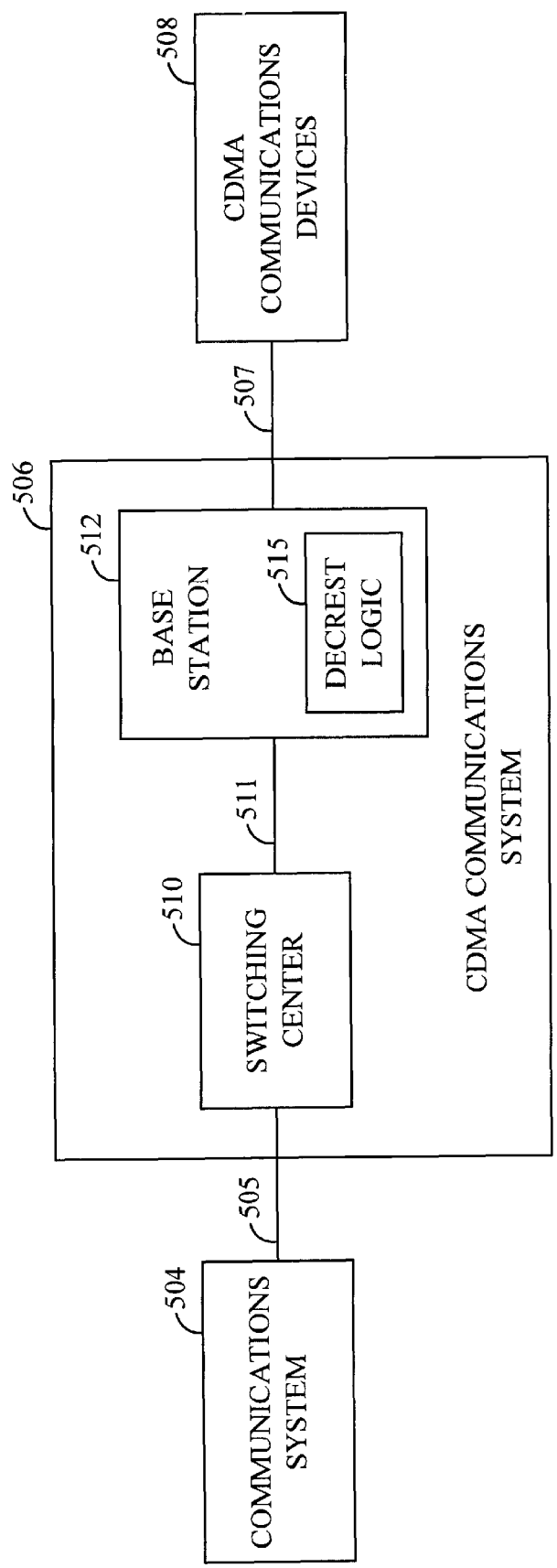
FIG. 5 is a block diagram of a CDMA system with decresting logic.

FIGS. 5–9 depict a specific example of a CDMA system that uses decresting, but those skilled in the art will recognize numerous other types of CDMA systems that are applicable to the decresting invention described above. FIG. 5 depicts a communications system 504 that is connected to the CDMA communications system 506. The CDMA communications system 506 communicates with CDMA communications devices 508. The CDMA communications system 506 is comprised of a switching center 510 and a base station 512. The communications system 504 exchanges communications signals 505 with the switching center 510. The switching center 510 exchanges communications signals 511 with the base station 512. The base station 512 exchanges wireless CDMA communications signals 507 over the air interface with the CDMA communications devices 508.

The communications system 504 could be any communications system capable of exchanging communications signals 505 with the CDMA communications system 506. The communications system 504 is typically a conventional public telephone network, but could also be many other networks, such as a local area network, wide area network, or internet.

The switching center 510 could be any device that provides an interface between the base station 512 and the communications system 504. Typically, numerous base stations are connected to the communications system 504 through the switching center 510, but the number of base stations has been restricted for the purpose of clarity.

The base station 512 exchanges wireless CDMA signals 507 with the CDMA communications devices 508. The base station 512 includes decresting logic 515 that decrests CDMA signal peaks before amplification and transmission to the CDMA communications devices 508. Typically, numerous CDMA communications devices exchange signals with the base station 512, but the number of communications devices has been restricted for the purpose of clarity. Those skilled in the art could adapt the base station 512 from known systems, such as the base stations provided by Qualcomm, Inc. of San Diego, Calif.

The CDMA communications devices 508 exchange wireless CDMA signals 507 with the base station 512. The typical CDMA communications device is a mobile telephone, but other CDMA communications devices are also possible, such as fixed wireless devices, data terminals, set-top boxes, or computers.

In operation, the CDMA communications devices 508 communicate through the CDMA communications system 506 with the communications system 504 or with each other. The decresting logic 515 in the base station 512 decrests CDMA signal peaks on the communications path from the communications system 504 to the CDMA communications devices 508. Decresting CDMA signal peaks allows the base station 512 to operate more efficiently and with a greater range or capacity.

Figure 6:
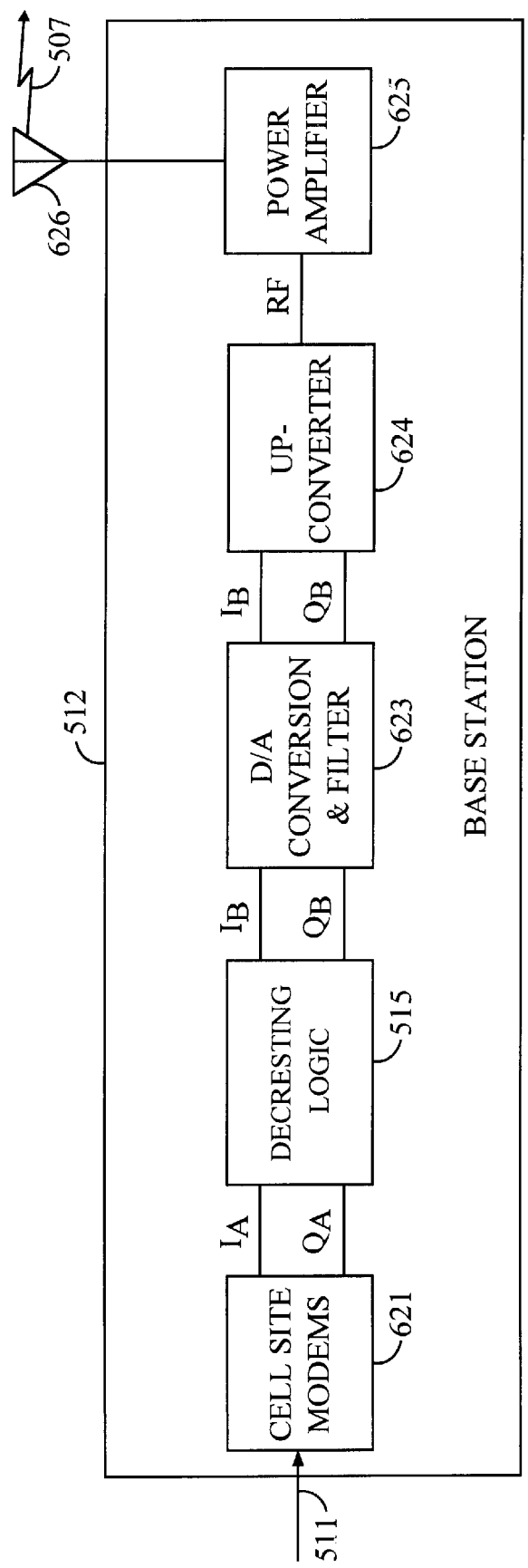
FIG. 6 is a block diagram of a CDMA base station with decresting logic.

FIG. 6 depicts the base station 512 of FIG. 5 receiving the communications signals 511 and transmitting the CDMA communications signals 507. The base station 512 is comprised of the following elements connected in series: cell site modems 621, decresting logic 515, digital-to-analog conversion and filter 623, up-converter 624, power amplifier 625, and antenna 626. Aside from the decresting logic 515, those skilled in the art are familiar with these elements and their operation.

The cell site modems 621 produce a CDMA signal comprised of quadrature signals Ia and Qa. Quadrature CDMA signals Ia and Qa are well-known and are the baseband signals to be transmitted using carriers of the same frequency, but in phase quadrature. In other words, the RF CDMA signal can be constructed by modulating Ia by cosine (2×pi×frequency×time) and by modulating Qa by sine (2×pi×frequency×time). In IS-95A for example, quadrature signals carry the same data with different pseudo-random sequence codes. The quadrature signals Ia and Qa each have signal peaks as illustrated in FIG. 2. The cell site modems 621 may apply forward error correction coding before transferring the quadrature signals Ia and Qa to the decresting logic 515.

The decresting logic 515 eliminates or reduces the peaks to create corrected quadrature signals Ib and Qb. The decresting logic 515 provides the decrested Ib and Qb signals to the digital-to-analog conversion and filter 623. Based on this document, those skilled in the art will appreciate how to assemble the decresting logic 515 using conventional circuitry and software.

The digital-to-analog conversion and filter 623 converts the decrested Ib and Qb signals to analog and filters out components outside of the desired bandwidth. The digital-to-analog conversion and filter 623 provides the analog Ib and Qb signals to the up-converter 624. The up-converter 624 modulates the analog Ib and Qb signals with intermediate and radio frequencies to form a Radio Frequency (RF) CDMA signal. The power amplifier 625 amplifies the RF CDMA signal using the characteristics illustrated in FIG. 3. Because of decresting, the power amplifier 625 operates at a higher and more efficient power level without generating intolerable amounts of out-of-band signal power. The antenna 626 transmits the amplified RF CDMA signal 507.

Figure 7:
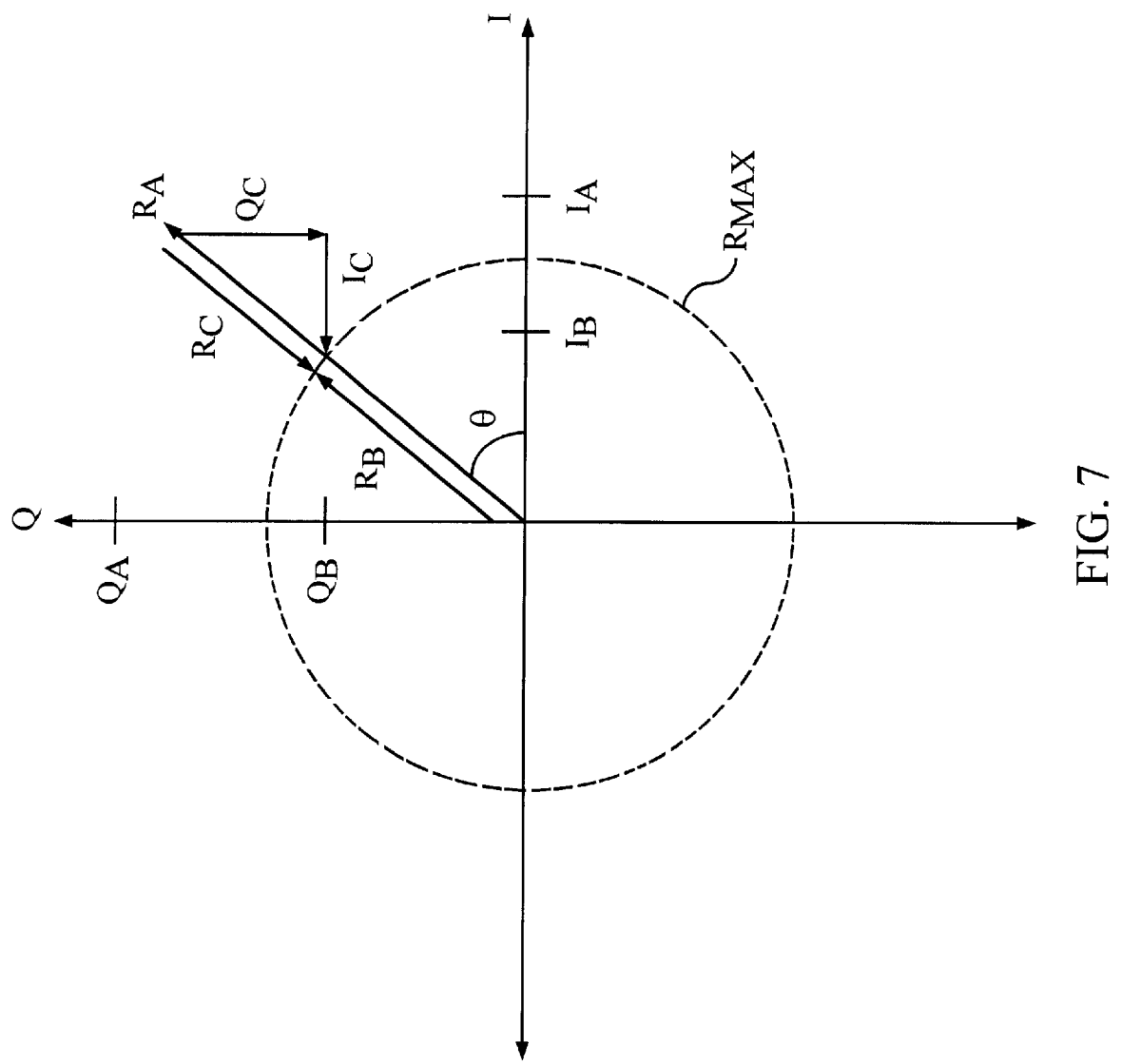
FIG. 7 is a graph illustrating quadrature signals.

FIG. 7 depicts representations of quadrature signals. The vertical axis represents values for Q quadrature signals, and the horizontal axis represents values for I quadrature signals. The time axis comes out of the page. The rectangular coordinate representations of the signals Qa, Qb, Ia, and Ib from FIG. 6 are indicated on the I axis and Q axis of FIG. 7. Radius Ra and angle θ show a polar coordinate representation of the quadrature signals Qa and Ia. Ra represents CDMA signal strength and exceeds a circle labeled Rmax. Other shapes could also be used with some examples being squares or diamonds. Rmax corresponds to the Vmax and the Pmax of FIGS. 2 and 3 respectively, ands Rmax could be set or adjusted based on the factors described above for Pmax. Thus, the portion of Ra beyond Rmax represents a CDMA signal peak. A correction signal Rc would reduce Ra to the Rmax circle. Rc can be represented by quadrature correction signals Qc and Ic. Decresting is achieved by correcting the quadrature CDMA signals Qa and Ia with the quadrature correction signals Qc and Ic to generate the corrected quadrature CDMA signals Qb and Ib.

Figure 8:
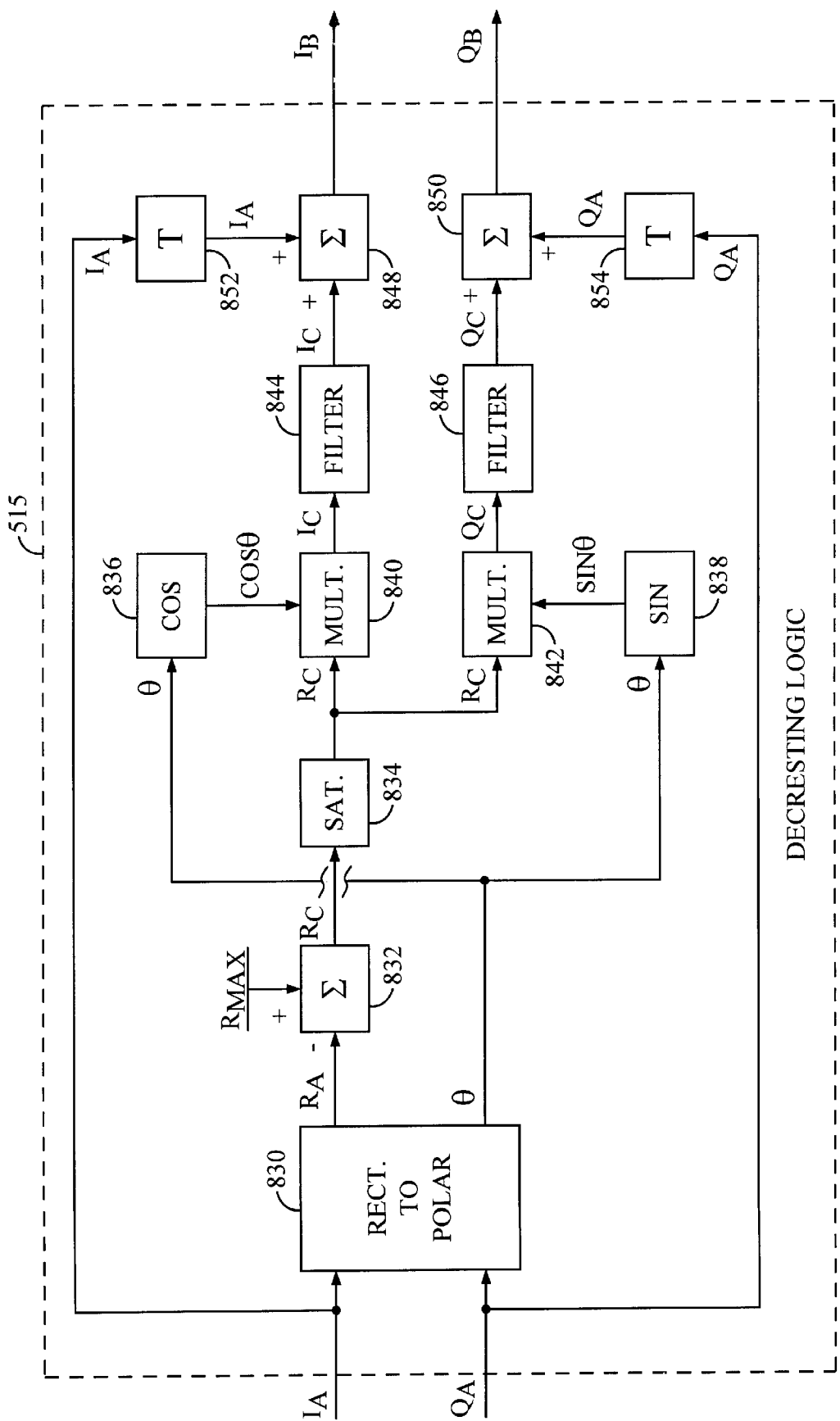
FIG. 8 is a block diagram of decresting logic.

FIG. 8 depicts the decresting logic 515 from FIG. 6. The decresting logic 515 receives the rectangular quadrature signals Ia and Qa and generates the corrected quadrature signals Ib and Qb. The following discussion refers to the signals depicted on FIG. 7. A rectangular-to-polar conversion element 830 receives Ia and Qa and generates Ra and θ. Subtraction element 832 subtracts Ra from Rmax to generate Rc. Rc is negative if Ra exceeds Rmax, which occurs when a peak is encountered. Saturation element 834 reduces positive values of Rc to zero. The saturation element 834 provides Rc to the multiplication elements 840 and 842

The conversion element 830 also provides θ to cosine element 836 and sine element 838. Cosine element 836 and sine element 838 respectively provide cosine θ and sine θ to the multiplication elements 840 and 842. The multiplication elements 840 and 842 multiply Rc with cosine θ and sine θ to respectively generate Ic and Qc. The multiplication elements 840 and 842 respectively provide Ic and Qc to filter elements 844 and 846. The filter elements 844 and 846 remove out-of-band components from Ic and Qc and respectively provide the signals to, addition elements 848 and 850. The filtering elements could also remove some in-band components as well. The filtering is important because it converts the decresting logic 515 from a clipping circuit or hard-limiter into a soft-limiter. Soft-limiting is important because it does not generate the unwanted transients that are produced by hard-limiting.

In addition to the conversion element 830, Ia and Qa are respectively provided to time delay elements 852 and 854. The time delay elements 852 and 854 introduce a time delay that corresponds to the time required to generate Ic and Qc. The time delay elements 852 and 854 respectively provide Ia and Qa to the addition elements 848 and 850 so that they match in the time domain with Ic and Qc respectively. The addition element 848 adds Ic to Ia to produce the corrected quadrature signal lb. The addition element 850 adds Qc to Qa to produce the corrected quadrature signal Qb.

Figure 9:
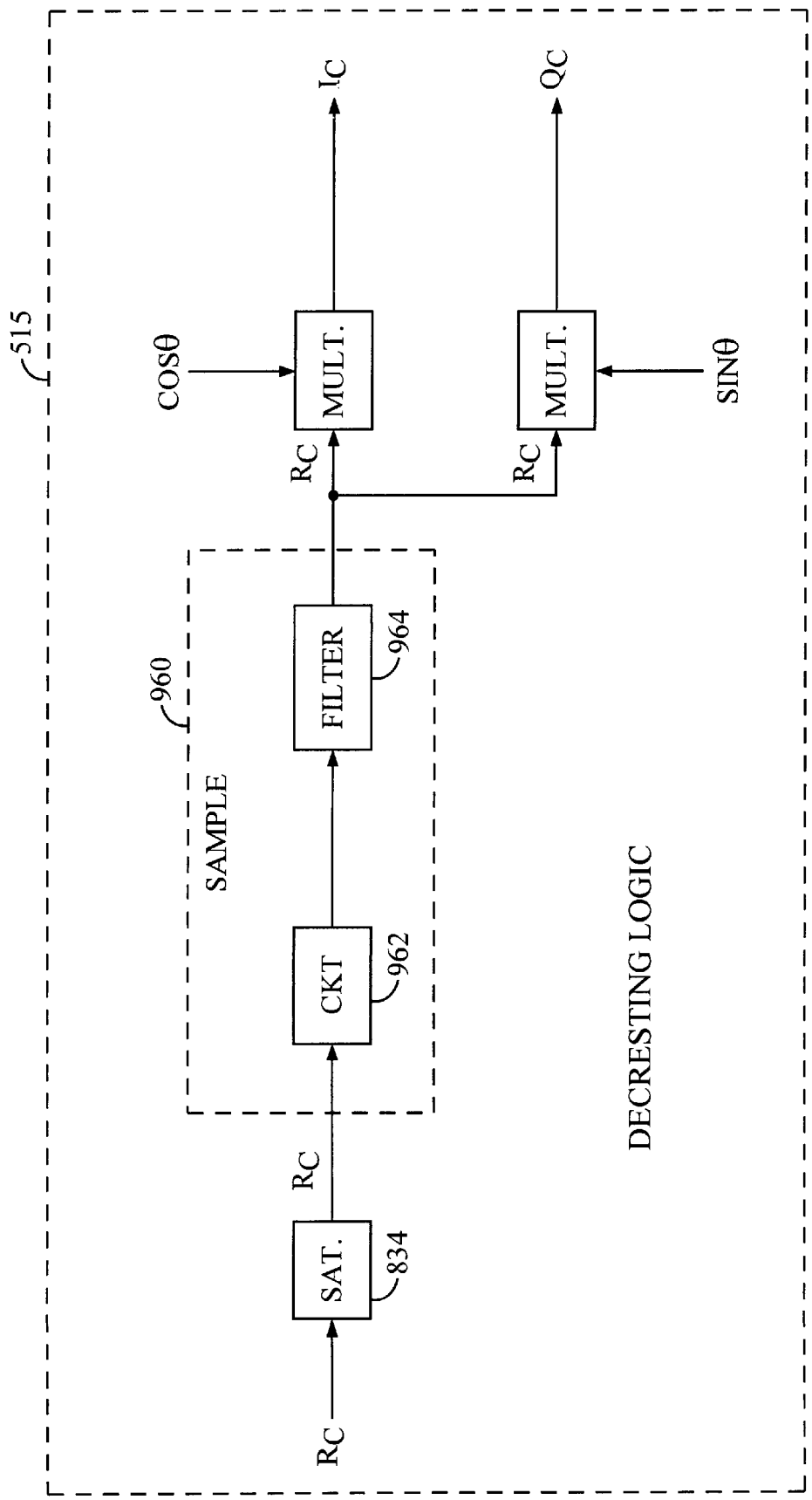
FIG. 9 is a block diagram of alternative decresting logic.
Figure 10:
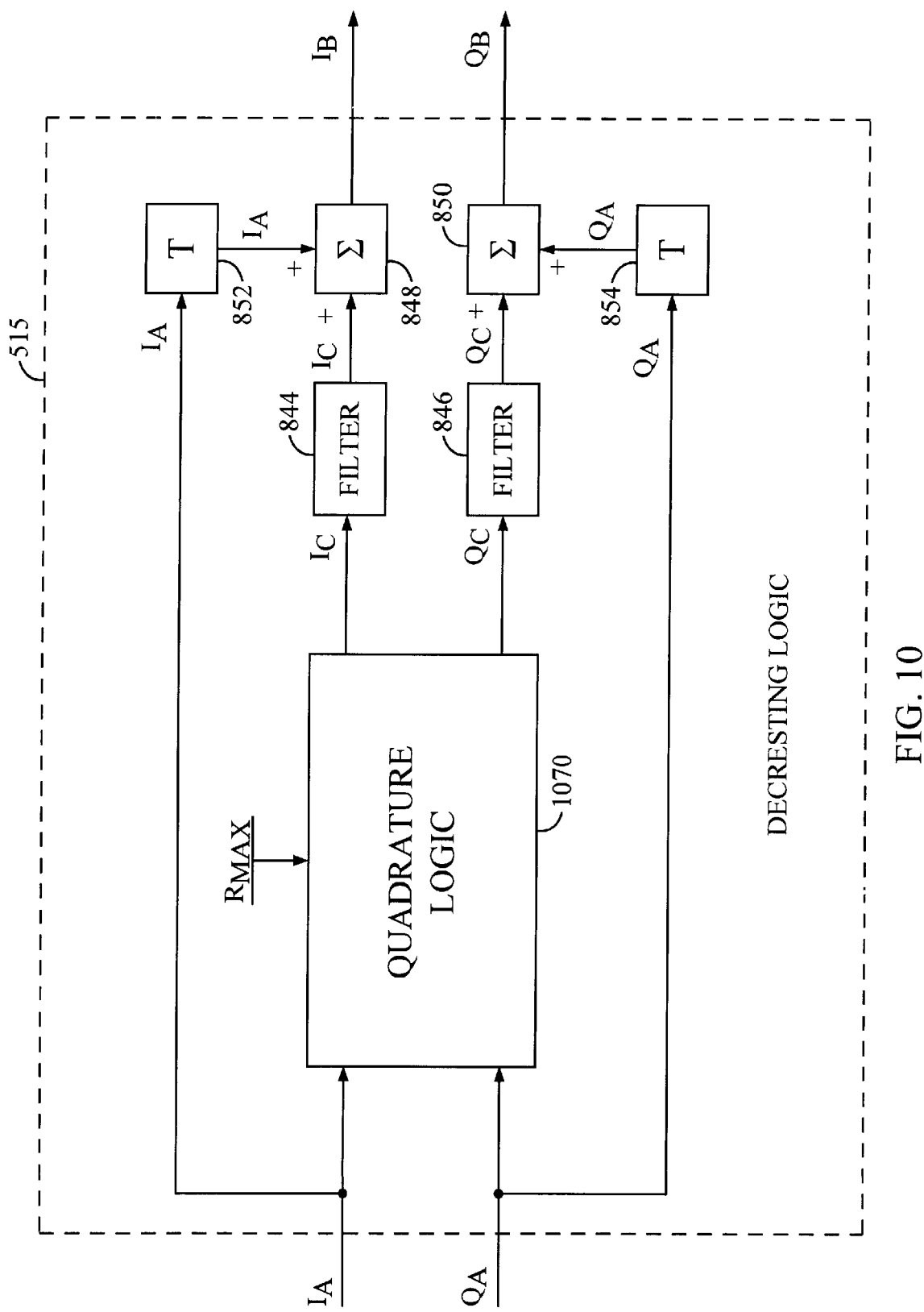
FIG. 10 is a block diagram of alternative decresting logic.

Alternative Decresting Logic—FIGS. 9–10

FIG. 9 depicts an alternative version of decresting logic 515. Essentially, a sampling element 960 comprising circuitry 962 and a low-pass filter 964 is added in between the saturation element 834 and the multiplication elements 840 and 842 on FIG. 8. The remaining configuration and operation is unchanged from FIG. 8.

The saturation element 834 provides Rc to the sampling element 960. The circuitry 962 samples Rc to detect a sample that exceeds the threshold and has the largest magnitude. This largest-magnitude sample represents a high point in the associated CDMA signal peak. The circuitry 962 passes only this largest-magnitude sample that exceeds the threshold through the low-pass filter 964. The sampling element 960 provides the resulting Rc to the multiplication elements 840 and 842. The multiplication elements 840 and 842 multiply Rc with cosine θ and sine θ to respectively generate Ic and Qc. Ic and Qc are scaled versions of the negative impulse response of the lowpass filter 964 in sampling element 960. The scaling is such that the negative impulse responses, when added to the delayed signals Ia and Qa, will reduce the CDMA signal peak from Ra to Rmax.

FIG. 10 depicts another alternative version of decresting logic 515. Essentially, the quadrature logic 1070 replaces the elements 830–842 on FIG. 8. On FIG. 10, the decresting logic 515 receives the rectangular quadrature signals Ia and Qa and generates the corrected quadrature signals Ib and Qb. Quadrature logic 1070 processes Ia, Qa, and Rmax to produce Ic and Rc according to the following equations:

$$Ic = Ia\left[\frac{R\max}{\sqrt{Ia^2 + Qa^2}} - 1\right] \text{and positive bracketed terms are set to zero.} \quad (1)$$

$$Qc = Qa\left[\frac{R\max}{\sqrt{Ia^2 + Qa^2}} - 1\right] \text{and positive bracketed terms are set to zero.} \quad (2)$$

The quadrature logic 1070 provides Ic and Qc to filter elements 844 and 846 respectively. The filter elements 844 and 846 remove out-of-band components from Ic and Qc and respectively provide the signals to addition elements 848 and 850.

In addition to the quadrature logic 1070, Ia and Qa are respectively provided to time delay elements 852 and 854. The time delay elements 852 and 854 introduce a time delay that corresponds to the time required to generate Ic and Qc. The time delay elements 852, and 854 respectively provide Ia and Qa to the addition elements 848 and 850 so that they match in the time domain with Ic and Qc respectively. The addition element 848 adds Ic to I a to produce the corrected in-phase signal lb. The addition element 850 adds Qc to Qa to produce the corrected in-phase signal Qb.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for processing a first rectangular component and a second rectangular component of a quadrature Code Division Multiple Access (CDMA) signal, the method comprising:

introducing a time delay into the first rectangular component and the second rectangular component to generate a time-delayed first rectangular component and a time-delayed second rectangular component;

generating a polar radius component and a polar angular component of the quadrature CDMA signal;

processing a value and the polar radius component to generate a polar radius correction value;

multiplying the polar radius correction value by sine of the polar angular component to generate a first rectangular correction value;

multiplying the polar radius correction value by cosine of the polar angular component to generate a second rectangular correction value;

filtering components from the first rectangular correction value to generate a first filtered correction value;

filtering components from the second rectangular correction value to generate a second filtered correction value;

combining the first filtered correction value with the time-delayed first rectangular component to generate a first corrected rectangular component; and combining the second filtered correction value with the time-delayed second rectangular component to generate a second corrected rectangular component.

2. The method of claim 1 wherein generating the correction signal comprises processing quadrature components of the CDMA signal.

3. The method of claim 2 wherein processing quadrature components of the CDMA signal comprises processing polar coordinate representations of the quadrature components of the CDMA signal.

4. The method of claim 3 wherein processing the polar coordinate representations of the quadrature components of the CDMA signal comprises:

generating a polar coordinate representation of the correction value in response to the peaks in the CDMA signal that exceed the value; and generating rectangular coordinate representation of the correction value from the polar coordinate representation;

filtering components from the rectangular coordinate representation to generate a filtered rectangular coordinate representation; and combining the filtered rectangular coordinate representation of the correction value with rectangular coordinates for the quadrature version of the CDMA signal.

5. The method of claim 1 further comprising;

amplifying the decrested CDMA signal to generate an amplified CDMA signal; and transmitting the amplified CDMA signal.

6. The method of claim 5 wherein the method is performed by a CDMA base station.

7. The method of claim 1 wherein the value is based on unused Walsh energy.

8. The method of claim 1 wherein the value is based on temperature.

9. The method of claim 1 wherein the value is based on a measurement of waveform fidelity.

10. The method of claim 1 wherein the value is based on a ratio of bit energy to noise.

11. The method of claim 1 wherein processing the value and the polar radius component to generate the polar radius correction value further comprises:

sampling a difference between the value and the polar radius component to generate samples; and passing at least one of the samples through a low-pass filter to generate the polar radius correction value.

12. A Code Division Multiple Access (CDMA) device for processing a first rectangular component and a second rectangular component of a quadrature Code Division Multiple Access (CDMA) signal comprising:

means for introducing a time delay into the first rectangular component and the second rectangular component to generate a time-delayed first rectangular component and a time-delayed second rectangular component;

means for generating a polar radius component and a polar angular component of the quadrature CDMA signal;

processing a value and the polar radius component to generate a polar radius correction value;

means for multiplying the polar radius correction value by sine of the polar angular component to generate a first rectangular correction value;

means for multiplying the polar radius correction value by cosine of the polar angular component to generate a second rectangular correction value;

means for filtering components from the first rectangular correction value to generate a first filtered correction value;

means for filtering components from the second rectangular correction value to generate a second filtered correction value;

means for combining the first filtered correction value with the time-delayed first rectangular component to generate a first corrected rectangular component; and means for combining the second filtered correction value with the time-delayed second rectangular component to generate a second corrected rectangular component;

decresting logic that is operational to generate a correction signal in response to peaks in a CDMA signal that exceed a value of the CDMA signal, and to combine the correction signal with the CDMA signal to generate a decrested CDMA signal with reduced peaks; and a power amplifier that is operational to amplify the decrested CDMA signal to generate an amplified CDMA signal.

13. The device of claim 12 wherein the device is a CDMA base station.

14. The device of claim 12 wherein the decresting logic is operational to generate the correction signal by processing quadrature components of the CDMA signal.

15. The device of claim 14 wherein the decresting logic is operational to process polar coordinate representations of the quadrature components of the CDMA signal.

16. The device of claim 15 wherein the decresting logic is operational to generate a polar coordinate representation of the correction value in response to the peaks in the CDMA signal that exceed the value, to generate rectangular coordinate representation of the correction value from the polar coordinate representation, and to combine the rectangular coordinate representation of the correction value with rectangular coordinates for the quadrature version of the CDMA signal.

17. The device of claim 12 wherein the value is based on unused Walsh energy.

18. The device of claim 12 wherein the value is based on temperature.

19. The device of claim 12 wherein the value is based on a measurement of waveform fidelity.

20. The device of claim 12 wherein the value is based on a ratio of bit energy to noise.

* * * * *